United States Patent
Allen et al.

(10) Patent No.: US 6,869,013 B2
(45) Date of Patent: Mar. 22, 2005

(54) SYSTEMS AND METHODS FOR THE IDENTIFICATION AND DISPLAYING OF INFORMATION

(75) Inventors: Marc L. Allen, Chesapeake, VA (US); Anton Bakker, Norfolk, VA (US)

(73) Assignee: Outsite Networks, Inc., Norfolk, VA (US)

( * ) Notice: Subject to any disclaimer, the term of this patent is extended or adjusted under 35 U.S.C. 154(b) by 0 days.

(21) Appl. No.: 10/137,375

(22) Filed: May 3, 2002

(65) Prior Publication Data

US 2002/0179703 A1 Dec. 5, 2002

Related U.S. Application Data

(60) Provisional application No. 60/288,329, filed on May 4, 2001.

(51) Int. Cl.[7] .................................................. G06F 7/08
(52) U.S. Cl. ........................ 235/381; 235/380; 235/384; 235/375; 705/14; 705/17; 705/413; 700/241; 700/237; 725/34; 340/5.9
(58) Field of Search ................................. 700/237, 238, 700/231, 241, 236; 340/3.1, 5.9; 725/34; 235/383, 385, 462.01, 462.13, 462.14, 462.45, 462.46, 472.01, 472.02, 454, 375, 381, 380, 384; 705/14, 16, 17, 413; 902/22, 37, 39, 40, 41

(56) References Cited

U.S. PATENT DOCUMENTS

| | | | |
|---|---|---|---|
| 5,250,789 A | * 10/1993 | Johnsen | ..................... 235/383 |
| 5,504,675 A | 4/1996 | Cragun et al. | |
| 5,642,484 A | 6/1997 | Harrison, III et al. | |
| 5,719,781 A | * 2/1998 | Leatherman et al. | ........ 700/237 |
| 5,774,868 A | 6/1998 | Cragun et al. | |
| 5,814,798 A | * 9/1998 | Zancho | ....................... 235/380 |
| 5,821,513 A | * 10/1998 | O'Hagan et al. | ........... 235/383 |
| 5,859,414 A | * 1/1999 | Grimes et al. | .............. 235/383 |
| 5,966,696 A | 10/1999 | Giraud | |
| 6,029,890 A | 2/2000 | O'Hagan et al. | |
| 6,098,879 A | * 8/2000 | Terranova | .................... 235/384 |
| 6,129,274 A | 10/2000 | Suzuki | |
| 6,152,591 A | * 11/2000 | McCall et al. | .............. 700/231 |
| 6,269,173 B1 | 7/2001 | Hsien | |
| 6,314,406 B1 | * 11/2001 | O'Hagan et al. | ............. 705/14 |

(List continued on next page.)

FOREIGN PATENT DOCUMENTS

WO    WO 02/44910 A1  *  6/2002

Primary Examiner—Jared J. Fureman
(74) Attorney, Agent, or Firm—Carlos R. Villamar; Nixon Peabody, LLP

(57) ABSTRACT

A user identifies themselves to an information display device using, for example, an identification-carrying device that contains a unique identification code. The identification code is associated with a particular profile that identifies, for example, customer loyalty, preference and history data that may be associated with a particular user. An identification sensor senses the identification code on the identification-carrying device. The identification code is then forwarded to an information server. The information server uses the identification code, and possibly additional information such as an identification of the information display device, to access loyalty and preference data associated with the identification code. This information can include, for example, coupons that have been issued to the user associated with the identification code, a user's preferences, a user's purchase history, or the like. This information is then analyzed to determine what information, if any, should be forwarded to the user.

42 Claims, 4 Drawing Sheets

U.S. PATENT DOCUMENTS

| | | | |
|---|---|---|---|
| 6,422,464 B1 * | 7/2002 | Terranova | 235/384 |
| 6,549,912 B1 | 4/2003 | Chen | |
| 6,550,672 B1 * | 4/2003 | Tracy et al. | 235/383 |
| 6,778,967 B1 * | 8/2004 | Nicholson | 705/14 |
| 2001/0049626 A1 * | 12/2001 | Nicholson | 705/14 |
| 2001/0052000 A1 | 12/2001 | Giacalone, Jr. | |
| 2002/0046117 A1 * | 4/2002 | Marion | 705/14 |
| 2002/0092907 A1 * | 7/2002 | Matsushita | 235/383 |
| 2002/0120508 A1 * | 8/2002 | Matsumoto et al. | 705/14 |
| 2002/0139846 A1 * | 10/2002 | Needham et al. | 235/383 |
| 2002/0147648 A1 * | 10/2002 | Fadden et al. | 705/16 |
| 2002/0166119 A1 * | 11/2002 | Cristofalo | 725/34 |
| 2002/0184098 A1 | 12/2002 | Giraud et al. | |
| 2003/0028285 A1 | 2/2003 | Zura et al. | |
| 2003/0052165 A1 * | 3/2003 | Dodson | 235/381 |
| 2003/0055530 A1 * | 3/2003 | Dodson | 700/231 |
| 2003/0075600 A1 * | 4/2003 | Struthers et al. | 235/381 |
| 2003/0088832 A1 | 5/2003 | Agostinelli et al. | |
| 2003/0103644 A1 | 6/2003 | Klayh | |
| 2003/0115096 A1 | 6/2003 | Reynolds et al. | |
| 2003/0126013 A1 | 7/2003 | Shand | |
| 2003/0200008 A1 * | 10/2003 | Wilson | 700/236 |

* cited by examiner

SYSTEMS AND METHODS FOR THE IDENTIFICATION AND DISPLAYING OF INFORMATION

RELATED APPLICATION DATA

This application claims the benefit of and priority under 35 U.S.C. §119(e) to U.S. patent application Ser. No. 60/288,329, filed May 4, 2001, entitled "Customer Identifying Coupon Printer," which is incorporated herein by reference in its entirety.

BACKGROUND OF THE INVENTION

1. Field of the Invention

The present invention relates generally to the displaying of information. More particularly, the present invention relates to the identification and displaying of information based at least on an identification code.

2. Description of Related Art

Loyalty systems reward a customer for frequent use of a company's services, frequent purchasing of a company's goods, or the like. For example, frequent flyer miles are a prime example of how airlines reward passengers for traveling on their particular airline. The reward, based on the number of "miles" accumulated can vary from discounts on future airline ticket purchases, to seat upgrades, to free tickets, or the like.

Likewise, grocery stores often implement a coupon-printing scheme whereby customers are giving a coupon that is redeemable for future purchases upon having purchased a particular product. For example, if a user buys a particular brand of toothpaste, upon scanning of the toothpaste at the checkout counter, a printer associated with the cash register produces a coupon redeemable against the next purchase of a related mouthwash product. In this example, the triggering event for the printing of the coupon is the scanning, i.e., purchase, of a particular product.

SUMMARY

However, the generation of this coupon is independent of the identity and preferences of the user, or customer. For example, the user may not use mouthwash. Therefore, the printing of that particular coupon did not accomplish its intended purpose, the sale of another related product.

An exemplary embodiment of this invention can be used, for example, in conjunction with a loyalty system to provide information, such as coupons, to a user, such as a customer, based on their loyalty, purchasing habits, personal preferences, or the like. For example, an individual can identify themselves to an information display device, such as a coupon printer, using, for example, an identification-carrying device that contains a unique identification code. The identification code is associated with a particular profile that identifies, for example, customer loyalty, preference and history data that may be associated with a particular user. An identification sensor senses the identification code on the identification-carrying device. The identification code is then forwarded via, for example, a local information display device, to an information server. The information server uses the identification code, and possibly additional information such as an identification of the information display device, to access loyalty and preference data associated with the identification code. This information can include, for example, coupons that have been issued to the user associated with the identification code, a user's preferences, a user's purchase history, or the like.

Based on one or more of the above, the information server determines and forwards information, such as coupon information, back to the information display device which can then, for example, print the coupon for the user. The information can be, for example, anything from coupon parameters used to create a coupon to a fully formatted coupon ready for immediate printing. For example, the information display device, which can include a coupon printer, may be separate from any other form of customer interaction, such as point-of-purchase terminals, gasoline dispensers, ATM's, or the like. Thus, while the information can be associated with a particular user interaction, the information can, for example, also be independent of any transactions that may have occurred at the same location.

A typical loyalty system that could incorporate the systems and methods of this invention could possible have other identification device readers associated with cash registers and gasoline dispensers, or the like, that are capable of accumulating loyalty and/or purchasing information that could also be assimilated with the systems and methods of this invention. For example, upon a user filling their car with fuel, the fuel pump loyalty system, cooperating with the systems and methods of this invention, could determine whether the user would desire a coupon for a car wash. Upon the systems and methods of this invention determining that the user received a coupon for a car wash yesterday that was redeemed, the system can determine if another type of coupon would be more appropriate, or determine that no coupon is necessary at this time. Alternatively, the system could query the user before the printing of the coupon to ensure that the coupon is desired.

For example, with the systems and methods of this invention, the user, such as a convenience store customer, is not necessarily required to accept any information, such as coupons, that they may be eligible for simple because they identify themselves to the information display system. Instead, the customer is allowed to obtain the information that they desire at a time when they desire through one or more of preferences and an input device that can obtain feedback from the user.

This allows, for example, added versatility in terms of how and what types of information can be provided. Specifically, a coupon need not be printed at the location it is earned. Thus, for example, by having the loyalty, preference and purchasing data held at a central location, loyalty preferences can be tracked at any location. For example, coupon printing can occur across many sites, such as in a chain of convenience stores. Many of the current loyalty systems either require the coupons to be printed at the moment they are earned or are created and maintained by an overall brand. Thus, these brand-based systems are location and brand specific.

In contrast, and in accordance with another exemplary advantage of this invention, the information display system can operate across a plurality of locations, for example, owned by a plurality of different entities, regardless of the brand association, or type of product and/or service sold.

The basic concepts associated with this invention can be expanded to be incorporated into identification sensing devices already present. For example, already existing identification sensors could forward and communicate with the information server according to the principles of this invention to allow a local printer or display device associated with the identification sensing device to print and/or display information, such as a coupon. For instance, a retail store's electronic cash register that supports RFID (Radio Frequency IDentification) may, for example, after having identified the customer, prompt the customer if they would like any available coupons, or a selected group of coupons, printed on the associated printer. Alternatively, the information, such as coupons, need not be physically printed, but an electronic version of the information, such as a coupon, can be forwarded and reconciled with, for example, an existing payment system.

Aspects of the present invention relate to the management and display of data. In particular, aspects of the present invention relate to the presentation of specific data based on an identifier, such as an identification code, associated with a user.

Aspects of the present invention also relate to the printing of coupons and/or promotional material based on a sensed identification code.

Furthermore, aspects of the present invention relate to the management of a profile associate with the identification code. More specifically, aspects of the present invention relate to the management of a customer profile and preferences associated with a unique identification code which can, for example, be stored in an identification-carrying device.

Aspects of the present invention also relate to a coupon printer having an associated identification sensor for sensing an identification-carrying device.

Aspects of the present invention also relate to communicating user specific information to a centralized location and determining display information based on the sensed identification code.

Furthermore, aspects of the present invention relate to determining presentation information based on a sensed identification code and an information display device identification.

These and other features and advantages of this invention are described in or are apparent from the following detailed description of the embodiments.

BRIEF DESCRIPTION OF THE DRAWINGS

The embodiments of the invention will be described in detailed, with reference to the following figures wherein.

DETAILED DESCRIPTION OF THE INVENTION

Figure 1:
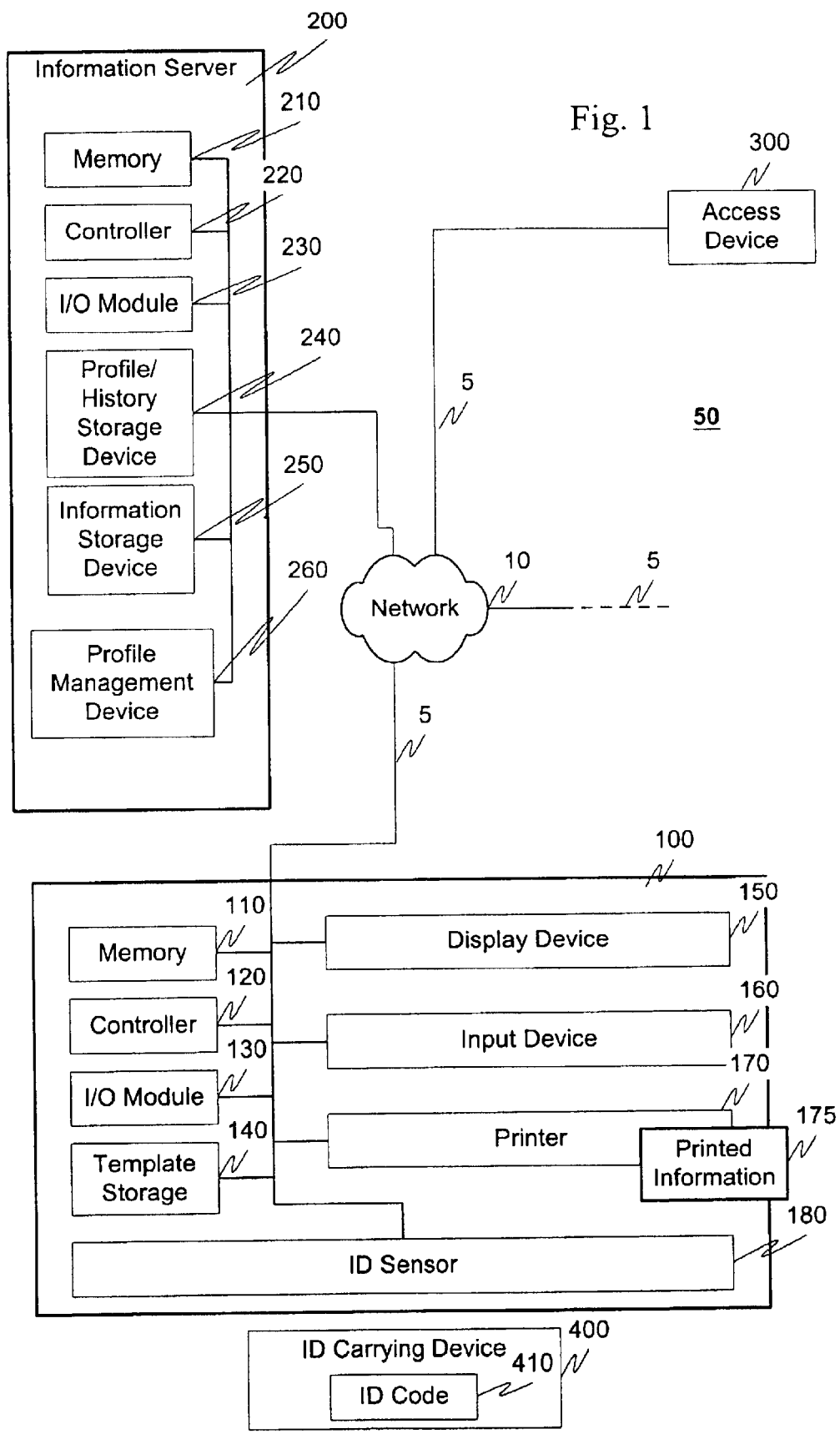
FIG. 1 is a functional block diagram illustrating an exemplary embodiment of the information display system according to this invention.

FIG. 1 illustrates an exemplary embodiment of an information display system 50. In particular, the information display system 50 comprises an information display device 100, and information server 200, and an access device 300, all interconnected by a network 10 and one or more links 5. The information display device 100 comprises a memory 110, a controller 120, an I/O module 130, a template storage 140, a display device 150, an input device 160, a printer 170 that outputs printed information 175, and an identification sensor (ID sensor) 180. The information display device 100 further communicates with an identification-carrying device 400 that stores one or more identification codes 410.

The information server 200 comprises a memory 210, a controller 220, an I/O module 230, a profile and history storage device 240, an information storage device 250 and a profile management device 260.

While the exemplary embodiments illustrated herein show the various components of the information display system collocated, it is to be appreciated that the various components of the information display system can be located at distant portions of a distributed network, such as a local area network, a wide area network, a telecommunications network, an intranet and/or the Internet, or within a dedicated information display system. Thus, it should be appreciated that the components of the information display system can be combined into one or more devices or collocated on a particular node of a distributed network, such as a communications network. As will be appreciated from the following description, and for reasons of computational efficiency, the components of the information display system can be arranged at any location within a distributed network without affecting the operation of the system.

Furthermore, it should be appreciated that the various links connecting the elements can be wired or wireless links, or any combination thereof, or any other know or later developed element(s) that is capable of supplying and/or communicating data to and from the connected elements. Additionally, the term module as used herein, denotes any piece of hardware, software, or combination thereof is capable of performing the functions associated with that element.

In operation, the identification-carrying device 400 is placed within the sensible area of the identification sensor 180. Upon the identification sensor 180 sensing one or more identification codes stored within the identification-carrying device 400, the information display device 100 forwards the one or more identifications, as well as any other relevant information, to the information server 200. The information server 200 determines, for example based on the one or more identifications and, for example, an identification of the information display device 100, the information, if any, to be returned to the information display device 100 for display. Upon having made the determination, the information server 200 forwards to the information display device 100 all, a portion, or an identifier of information to be displayed on the information display device 100. The information display device 100 then displays the information, for example on the display device 150 and/or the prints the information 175 on the printer 170.

The identification-carrying device 400 can be any device that is capable of communicating with the identification sensor 180 in order to transfer information, such as the one or more identification codes 410, to the identification sensor 180. For example, the identification-carrying device 400 can communicate with the identification sensor 180 via a direct contact system, such as a magnetic strip and the identification sensor 180 a magnetic strip reader, an optical communication system, a radio frequency communication system or any other known or later developed electrical, inductive or capacitive based system that is capable of communicating the identification code to the identification sensor 180.

For example, the identification-carrying device 400 can be based on RFID (radio frequency identification) which typically operates in the frequency range of 60 KHz to 5.8 GHz. Common identification-carrying devices 400 operate at 900 KHz, 125 KHz, 13.56 MHz and 2.4 GHz. Examples of direct contact systems include the smartcard technology and magnetic strip readers. Optical systems can include, for example, barcode readers. Additionally, the identification-carrying device 400 can be integrated into a portion of a larger device, such as a wand or tag connected to a key chain. Examples of these devices are the Texas Instruments® RFID tags, called "TIRIS", the Phillips® RFID tags, called "Mifair", OTI RFID tags, Dallas Semiconductor's® I-Button, or the like. Examples of smartcards, such as those produced by Schlumberger can also be used.

Alternatively, the identification-carrying device 400 can be a device that is capable of being written to as well as read from. For example, while the exemplary embodiments discussed below illustrate an embodiment where the user profile is stored on the information server 200, it is to be appreciated that it is also possible to store one or more portions of a user's profile on the identification-carrying device, or on a combination of the information server 200 and the identification-carrying device 400.

Upon the identification-carrying device 400 being placed in the sensible area of the identification sensor 180, the identification code 410 is read from the identification-carrying device 400 and forwarded, with the cooperation of the I/O module 130, the controller 120 and the memory 110, via network 10 and links 5, to the information server 200. Furthermore, the information display device 100 can supplement the identification code 410 code with additional information, such as the identifier of the information display device 100, the local time, whether any goods and/or services were purchased, an identification of those goods/services, local weather information, or in general any information that may be useful in terms of determining the information, if any, to be returned to the information display system 100. For example, if it is raining a coupon for a car wash is probably not appropriate.

Upon the information server 200 receiving the identification code and one or more additional portions of information, the information server 200 determines, with the cooperation of the memory 210, the controller 220, the I/O module 230 and the profile storage device 240, the type of information, if any, to be returned to the information display device 100. For example, the profile storage device 400 can make the determination based on the current transaction, a history of transactions associated with the particular identification code, a reward based system such as the "frequent flyer miles" program, a promotion based on a customer loyalty program, or the like.

Upon determining the type of information to be forwarded to the information display device 100, the profile storage device 240 cooperates with the information storage device 250, as well as the memory 210, the controller 220 and the I/O module 230, to retrieve and forward the selected information to the information display device 100. For example, the information storage device 250 can contain information, such as printable coupons, multi-media presentations, an identification and populatable portions of a template, audio and/or video clips, or the like, which is forwarded for subsequent display and/or printing at the information display device 100. Alternatively, the profile storage device 240 can forward an identifier to the information display device 100. This identifier corresponds to one or more types of information stored on the information display device 100 that can be displayed to, for example, a user.

Upon receipt of the information, or an identification of the information to be displayed, the information is displayed at the information display device 100 in cooperation with the memory 110, the controller 120 the I/O module 130, and if appropriate, the template storage 140. For example, based on the type of information, the information display device 100 determines one or more appropriate devices for displaying the information. For example, multimedia information can be displayed on the display device 150. Alternatively, information such as coupons can be displayed on the display device and printed via the printer 170.

In addition to being able to display information, the information display device 100 can allow a user to interact with one or more of the information display device 100 and the information server 200 via the input device 160. While the input device 160 is shown as a separate component, it is to be appreciated that, for example, the display device 150 and the input device 160 can be combined into one element, such as a touch screen. Alternatively, the input device 160 can be independent buttons such as, a "yes" and "no" buttons, or the like. Additionally, the input device can be speech activated and based on, for example, speech recognition and a voice driven menu and selection system.

Therefore, there are at least three modes of operation for the information display device 100. In a first mode, information is directly printed via the printer 170. In a second mode, and for example in conjunction with the display device 150, the user is prompted as to whether they would like to receive a print-out of selected information. For example, a preview of the information available to the user can be shown on the display device 150. If the user decides to receive a print-out of the information, the user selects, via a print button on input device 160, to print the information. Alternatively, the user can opt not to receive a print-out of the information and perhaps just view it on the display device 150. Thirdly, and again in conjunction with the display device 150 and the input device 160, the user can optional navigate through a variety of types of information that are available. If a printable version of the information is desired, the user can select, via the input device 160, to print that information. For example, if the information available to a user includes a coupon for a sandwich, a coupon for a car wash and coupon for a free gallon of gasoline, the user can select the coupon most appropriate for their needs.

The template storage device 140 is capable of storing one or more templates that can be used in association with the information server 200 for displaying information on one or more of the display device 150 and the printer 170. For example, the template storage 140 can store basic populatable coupon templates. Thus, the information server 200 can forward to the information display device 100 the information to be inserted into these templates. Then, with the cooperation of the controller 120 and the memory 110, the information from the information server 200 is merged with one or more templates in the template storage 140 and displayed. The templates can include printer templates, audio templates, video templates and/or multimedia templates.

Aside from the functionality associated with the user obtaining specific information associated with a particular identification code, the systems and methods of this invention also allow a user to create, manage and/or update their user profile, via, for example, access device 300. In particular, a user's profile is stored in the profile storage device 240. In general, the profile storage device 240 can contain any information about a user based on, for example, their associated identification code. For example, the profile storage device 140 can maintain an account of loyalty and/or rewards programs, user preferences, history logs, or any other information specific to a user.

A user accesses their profile with the access device 300. The access device 300 can be, for example, a computer, a PDA, a telephone, or the like. Alternatively, the access device 300 can be incorporated into the information display device 100. In general, the access device 300 allows a user to access, manage and manipulate one or more profiles stored in the profile storage device 240.

For example, and with the cooperation of the access device 300, a user enters their identification code, and, for example, a password. Upon authentication of the password, and in cooperation with the profile management device 260, the user is allowed to access portions of their profile. For example, the user can change their personal preferences regarding how they would like information to be displayed on the information display device 100. For example, a user can select that they always want have all available coupons printed, be queried whether they would like available coupons printed, to only show coupons for certain categories of goods, or the like. Furthermore, a user can access their profile to determine, for example, the number of points in a loyalty rewards program.

Table 1 shows various profile options available to a user.

| Display Preferences | Printing Preferences | Advertising Preferences | History Preferences | Status Preferences |
|---|---|---|---|---|
| Query Before Displaying | Print All Coupons | Show No Advertising | Remember All Transactions | Show Current Rewards "Points" |
| Display All Information | Print All Coupons For X | Show Advertising For X | Remember No Transactions | Do Not Show Status |
| Only Show Multimedia | Query Before Printing | Only Show Advertising For Local Merchant(s) | Only Remember Transaction If Associated With A Rewards Program | Alert When Award Threshold Reached |
| Only Show Information About X | Print Coupon Only If Similar Coupon Previously Redeemed | | Forward Rewards History at Predetermined Interval to Destination | |
| Show News Feed | Only Print Coupons That Are Instantly Redeemable | | | |
| Show Weather Feed | Only Print Coupons That Are Instantly Redeemable For Purchased Product | | | |

A user can also review a history of, for example, the coupons they have printed, the information they have viewed, and print reports detailing these transactions.

Figure 2:
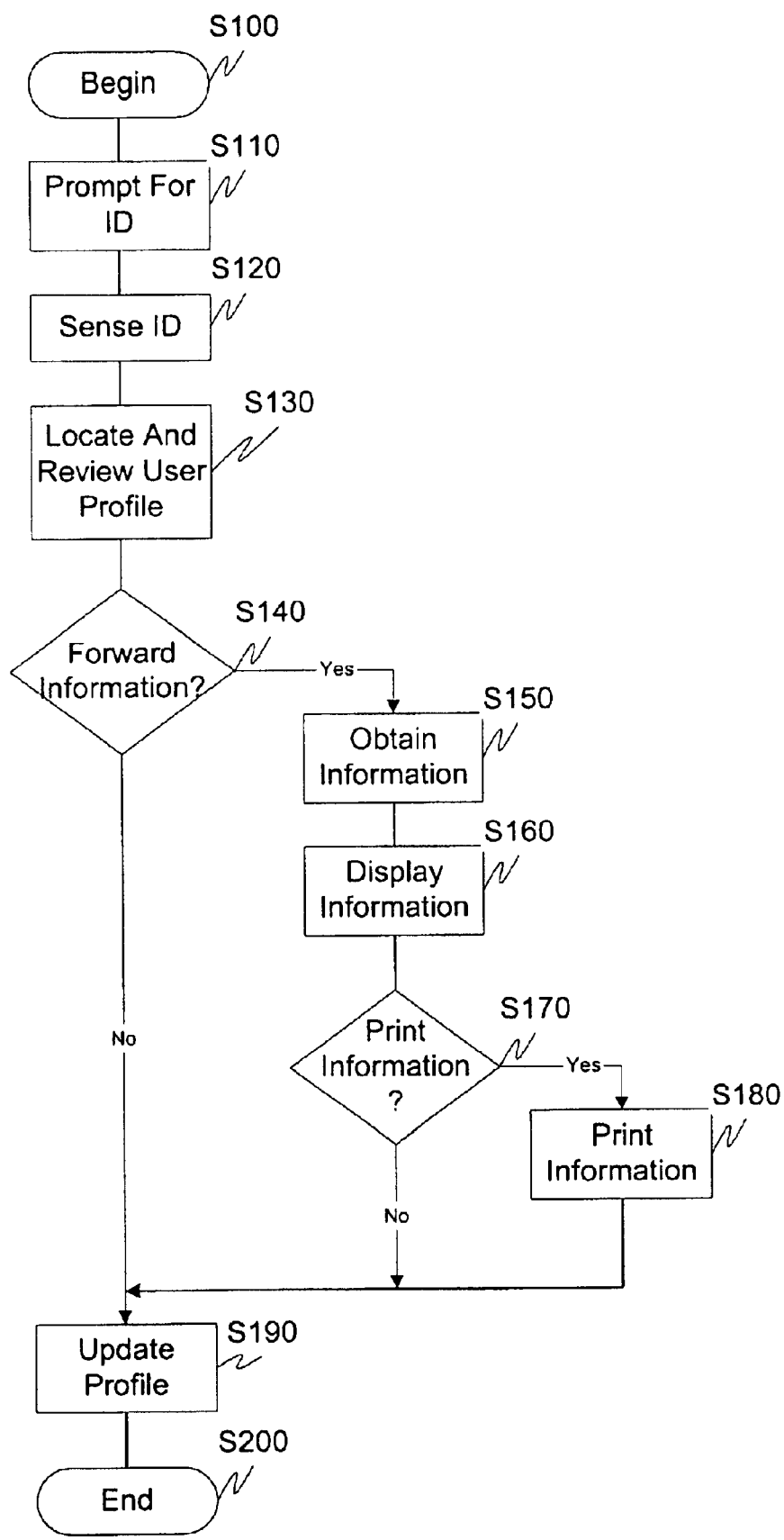
FIG. 2 is a flowchart illustrating an exemplary method of displaying information according to this invention.

FIG. 2 outlines the exemplary operation of the information display system. In particular, control begins in step S100 and continues to step S110. In step S110, a user can optionally be prompted to place their identification-carrying device in the sensible area of the identification sensor. For example, the prompting can be based on an audio or video que that could, for example, be triggered upon a user being within a certain proximity to an information display device.

Next, in step S120, the identification code is sensed and retrieved from the identification-carrying device. Then, in step S130, the user profile, based on the sensed identification code is located and reviewed. Control then continues to step S140.

In step S140, a determination is made as to whether information should be forwarded to the user. For example, if the user profile specifies that the user would like to maintain a record of purchases for a rewards type system, but not receive any coupons or printed information, control would jump directly to step S190. If information is to be forwarded to the user, control continues to step S150.

In step S150, the appropriate information, or an identification of the information to be displayed, is obtained. For example, as discussed above, the determination of the information to be displayed can be dynamically determined based one or more portions of information. Next, in step S160, the information is displayed. Then, in step S170, a determination is made whether all or a portion of the information should be printed. For example, as discussed earlier, the determination can be based on query to the user or, for example, based a user's profile, or the like. If the information is to be printed, control continues to step S180 where the information is printed. Alternatively, the information can be printed or forwarded to one or more alternative or additional locations. For example, the user can specify in their profile that only coupons that are instantly redeemable should be forwarded to the printer. Other information or coupons that, for example, are not instantly redeemable, could be forwarded via mail, electronic and/or hard copy, to a destination specified in the user's profile. Control then continues to step S190.

Alternatively, if there is no desire to print the information, control jumps to step S190.

In step S190, the user's profile is optionally updated. For example, as discussed previously, a user's history can be updated so as to, for example, log customers loyalty points, record a user's transactions, or the like. Control then continues to step S200 where the control sequence ends.

Figure 3:
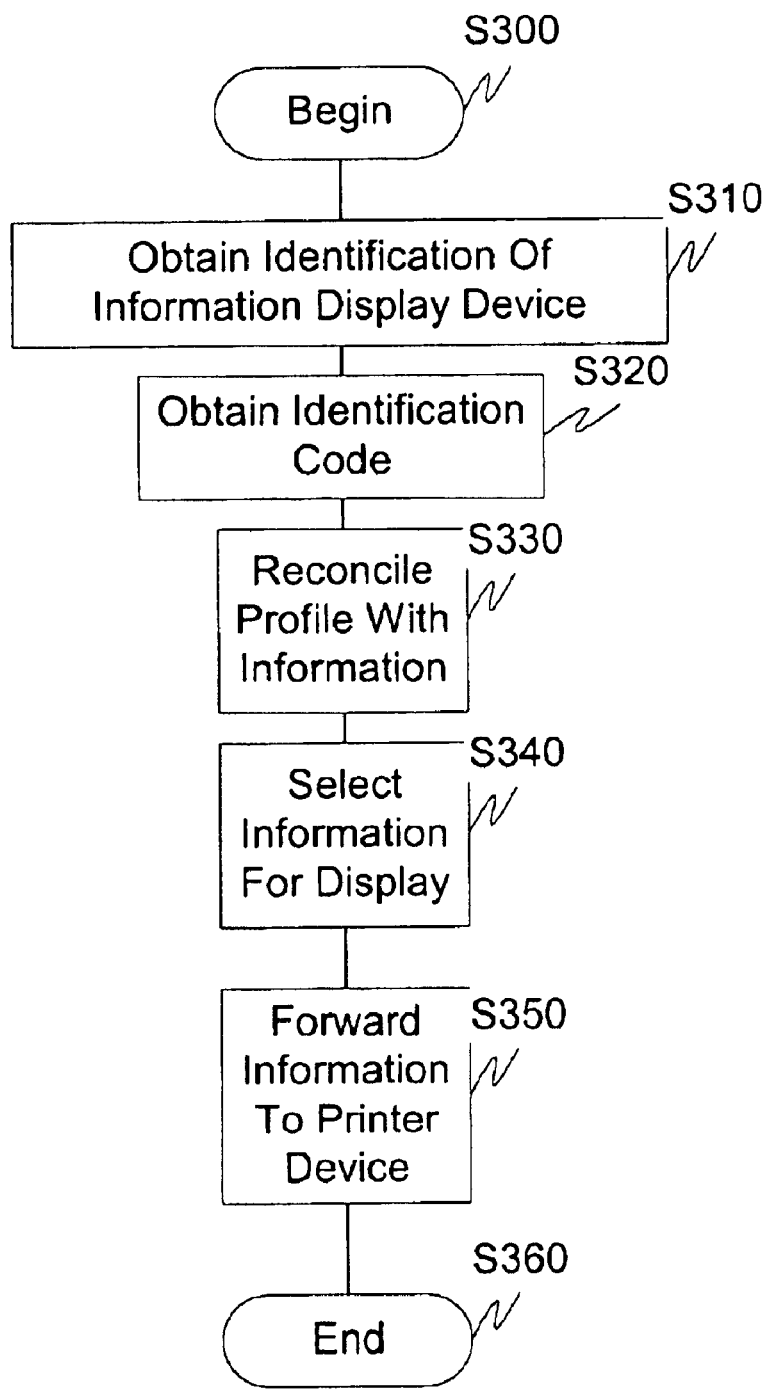
FIG. 3 is a flowchart illustrating an exemplary method of selecting information according to this invention.

FIG. 3 outlines an exemplary method of selecting information according to this invention. In particular, control begins in step S300 and continues to step S310. In step S310, the identification code of the information display device can be optional obtained. For example, as discussed previously, in conjunction with the identification code of a user, the identification code for the information display device can also be used to aid in selecting the type of information to be presented to a user. Next, in step S320, the identification code is obtained.

In step S330, one or more of the information display device identification code and the identification code is reconciled with a user's profile information. Based on this reconciliation, in step S340, information is selected for display. Control then continues to step S350.

In step S350, the selected information is forwarded to the information display to be viewed, printed, or the like, by the user. Control then continues to step S360 where the control sequence ends.

Figure 4:
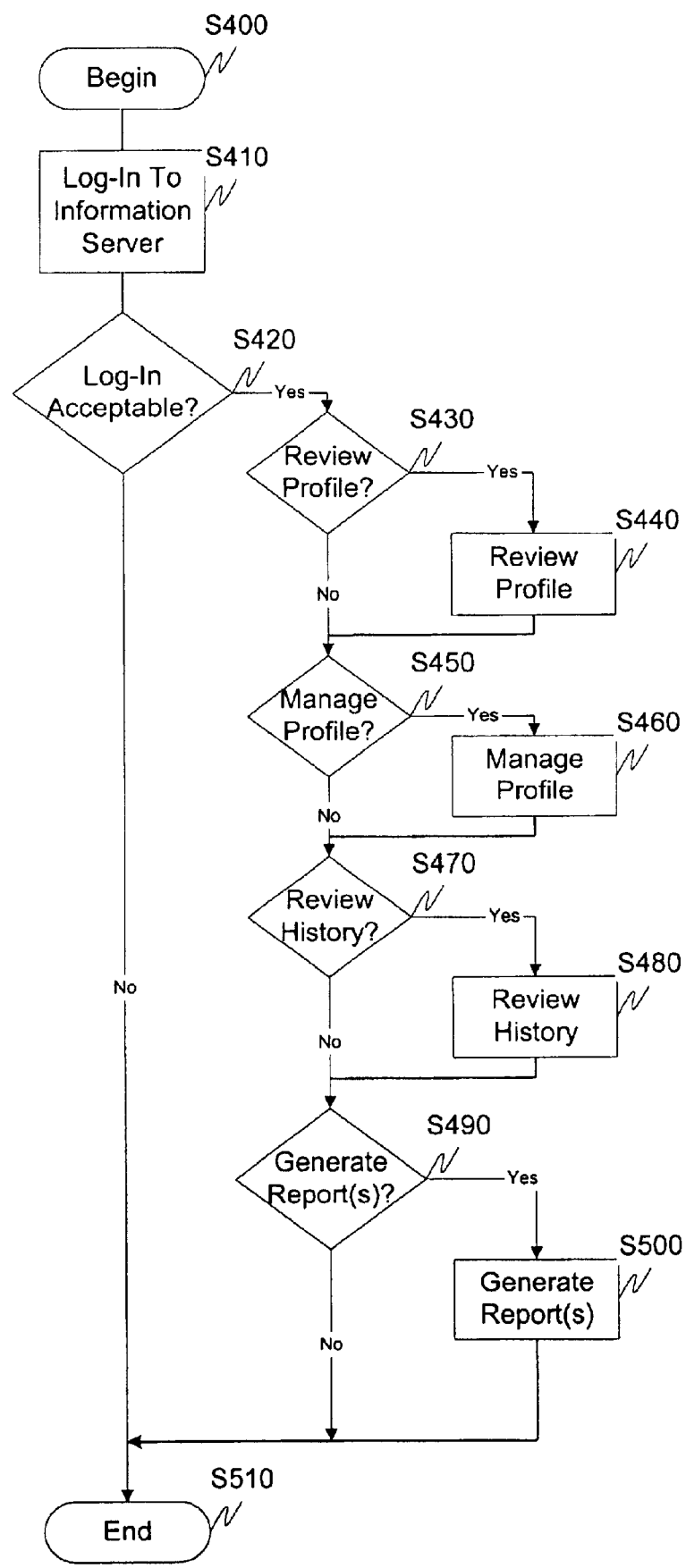
FIG. 4 is a flowchart illustrating an exemplary method of managing an account according to an exemplary embodiment of this invention.

FIG. 4 outlines an exemplary method of accessing and managing a profile associated with an identification code according to an exemplary embodiment of this invention. In particular, control begins in step S400 and continues to step S410. In step S410 a user logs on to the information server. Next, in step S420, a determination is made as to whether the login was acceptable. If the login was acceptable, control continues to step S430. Otherwise, control jumps to step S510 where the control sequence ends.

In step S430, a determination is made as to whether the user would like to review their profile. If the user would like to review their profile, control continues to step S440 where a portion of the profile can be reviewed. Otherwise, control jumps to step S450. In step S450, a determination is made as to whether the user would like to manage their profile. If the user would like to manage their profile, control continues to step S460 where the used can modify/update a profile. Otherwise, control jumps to step S470.

In step S470, a determination is made as to whether the user would like to review their history. If the user would like to review their history, control continues to step S480 where the history can be reviewed, printed, or the like. Otherwise, control jumps to step S490.

In step S490, a determination is made as to whether the user would like to generate one or more reports. If the user would like to generate one or more reports, control continues to step S500 where the reports are generated. Otherwise, control jumps to step S510 where the controls sequence ends.

The present invention for selecting and displaying information can be implemented in conjunction with an already existing customer loyalty type system, a point-of-purchase system, or a separate programmed general purpose computer having a communications device. The present method can also be implemented in a special purpose computer, a programmed microprocessor or a microcontroller and peripheral integrated circuit element(s), an ASIC or other integrated circuit, a digital signal processor, a hardwired or electronic logic circuit such as a discrete element circuit, a programmable logic device, such as a PLD, PLA, FPGA, PAL, or the like, and associated communications equipment.

Furthermore, the disclosed method may be readily implemented in software using object or object-oriented software development environments that provide portable source code that can be used on a variety of computer, workstation or modem hardware and/or software platforms. Alternatively, the method may be implemented partially or fully in hardware using standard logic circuits or a VLSI design. Other software or hardware can be used to implement the methods in accordance with this invention depending on the speed and/or efficiency requirements of the system, the particular function, and the particular software and/or hardware or microprocessor or microcomputer(s) being utilized. Of course, the present method can also be readily implemented in hardware and/or software using any known later developed systems or structures, devices and/or software by those of ordinary skill in the applicable art from the functional description provided herein and with a general basic knowledge of the computer and telecommunications arts.

Moreover, the disclosed methods can be readily implemented as software executed on a programmed general purpose computer, a special purpose computer, a microprocessor and associated communications equipment, or the like. In these instances, the methods and systems of this invention can be implemented as a program embedded in an information display system, or the like. The methods can also be implemented by physically incorporating operational equivalents of the methods into software and/or hardware, such as a hardware and software system of an information display system, or the like.

While this invention has been described in conjunction with a number of embodiments, it is evident that many alternatives, modifications and variations would be or are apparent to those of ordinary skill in the applicable art. Accordingly, applicant intends to embrace all such alternatives, modifications, equivalents and variations that are within the spirit and the scope of this invention.

I claim:

1. An information display system for use within a gas station, the system comprising:
   an identification sensor at a gasoline dispenser of the gas station that senses an identification code on one or more identification-carrying devices;
   an information server that receives at least the identification code and information display system identification information and determines one or more portions and type of information to be displayed at an information display system at the gasoline dispenser of the gas station based on the identification code and the information display system identification information;
   a printer at the gas station that receives and prints the one or more portions of information displayed at the information display system; and
   a template storage device that stores one or more templates that are combinable with the one or more portions of information.

2. The system of claim 1, wherein the information server is capable of determining the one or more portions of information independent of any sale transaction information.

3. The system of claim 1, wherein the information display system comprises a display device.

4. The system of claim 1, further comprising a profile storage device.

5. The system of claim 1, further comprising a history storage device.

6. The system of claim 1, further comprising a profile management device that cooperates with an access device to allow a user to manage a profile.

7. The system of claim 1, wherein the one or more portions of information are dynamically determined based on at least one of a loyalty program, a user history, a current transaction, a past transaction, and a user profile.

8. The system of claim 7, wherein the user profile comprises preferences governing the one or more portions of information to be printed at the printer.

9. The system of claim 1, wherein the one or more portions of information are dynamically determined upon receipt of the identification code at the information server.

10. The system of claim 1, wherein the identification sensor and the identification-carrying devices are one or more of a radio frequency identification tag and a radio frequency identification reader, an optical code and optical code reader, magnetic strip and magnetic strip reader and an inductive, capacitive or electrical identification-carrying device and associated inductive, capacitive or electrical sensor.

11. The system of claim 1, wherein one or more of a user profile and a user history are associated with the one or more identification-carrying devices.

12. The system of claim 1, wherein the information server is capable of servicing a plurality of information display systems for gas stations at geographically different locations.

13. The system of claim 1, wherein the information server uses the information display system identification information to aid in selecting the type of information to be displayed.

14. The system of claim 1, wherein the information server reconciles the information display system identification information with a user profile associated with the identification code for selecting the type of information to be displayed.

15. A method of displaying information for use within a gas station, the method comprising:
- sensing at a gasoline dispenser of the gas station at least an identification code on one or more identification-carrying devices;
- receiving at least the identification code and information display system identification information at an information server;
- determining one or more portions and type of information to be displayed on an information display system at the gasoline dispenser of the gas station based on the identification code and the information display system identification information;
- receiving and printing at the gas station the one or more portions of information displayed at the information display system; and
- storing on a template storage device one or more templates that are combinable with the one or more portions of information.

16. The method of claim 15, wherein the information server is capable of determining the one or more portions of information independent of any sale transaction information.

17. The method of claim 15, further comprising displaying the one or more portions of information.

18. The method of claim 15, further comprising storing a user profile in a profile storage device.

19. The method of claim 15, further comprising storing a user history in a history storage device.

20. The method of claim 15, further comprising allowing a user to manage a user profile.

21. The method of claim 15, wherein the one or more portions of information are dynamically determined based on at least one of a loyalty program, a user history, a current transaction, a past transaction, and a user profile.

22. The method of claim 21, wherein the user profile comprises preferences governing the one or more portions of information to be printed at the printer.

23. The method of claim 15, wherein the one or more portions of information are dynamically determined upon receipt of the identification code at the information server.

24. The method of claim 15, wherein the identification sensor and the identification-carrying devices are one or more of a radio frequency identification tag and a radio frequency identification reader, an optical code and optical code reader, magnetic strip and magnetic strip reader and an inductive, capacitive or electrical identification-carrying device and associated inductive, capacitive or electrical sensor.

25. The method of claim 15, wherein one or more of a user profile and a user history are associated with the one or more identification-carrying devices.

26. The method of claim 15, wherein the information server is capable of servicing a plurality of information display systems for gas stations at geographically different locations.

27. The method of claim 15, wherein the information server uses the information display system identification information to aid in selecting the type of information to be displayed.

28. The method of claim 15, wherein the information server reconciles the information display system identification information with a user profile associated with the identification code for selecting the type of information to be displayed.

29. An information storage media comprising information that displays information for use within a gas station, the information storage media comprising:
- information that senses at a gasoline dispenser of the gas station at least an identification code on one or more identification-carrying devices;
- information that receives at least the identification code and information display system identification information at an information server;
- information that determines one or more portions and type of information to be displayed on an information display system at the gasoline dispenser of the gas station based on the identification code and the information display system identification information;
- information that receives and prints at the gas station the one or more portions of information displayed at the information display system; and
- information that stores on a template storage device one or more templates that are combinable with the one or more portions of information.

30. The media of claim 29, wherein the information server is capable of determining the one or more portions of information independent of any sale transaction information.

31. The media of claim 29, further comprising information that displays the one or more portions of information.

32. The media of claim 29, further comprising information that stores a user profile in a profile storage device.

33. The media of claim 29, further comprising information that stores a user history in a history storage device.

34. The media of claim 29, further comprising information that allows a user to manage a user profile.

35. The media of claim 29, wherein the one or more portions of information are dynamically determined based on at least one of a loyalty program, a user history, a current transaction, a past transaction, and a user profile.

36. The media of claim 35, wherein the user profile comprises preferences governing the one or more portions of information to be printed at the printer.

37. The media of claim 29, wherein the one or more portions of information are dynamically determined upon receipt of the identification code at the information server.

38. The media of claim 29, wherein the identification sensor and the identification-carrying devices are one or more of a radio frequency identification tag and a radio frequency identification reader, an optical code and optical code reader, magnetic strip and magnetic strip reader and an inductive, capacitive or electrical identification-carrying device and associated inductive, capacitive or electrical sensor.

39. The media of claim 29, wherein one or more of a user profile and a user history are associated with the one or more identification-carrying devices.

40. The media of claim 29, wherein the information server is capable of servicing a plurality of information display systems of gas stations at geographically different locations.

41. The media of claim 29, wherein the information server uses the information display system identification information to aid in selecting the type of information to be displayed.

42. The media of claim 29, wherein the information server reconciles the information display system identification information with a user profile associated with the identification code for selecting the type of information to be displayed.

* * * * *